(12) United States Patent
Hiramoto et al.

(10) Patent No.: US 7,044,696 B2
(45) Date of Patent: May 16, 2006

(54) CHIP DISCHARGING DEVICE FOR MACHINE TOOL

(75) Inventors: Kazuyuki Hiramoto, Yamatokoriyama (JP); Kazutoyo Moriguchi, Yamatokoriyama (JP); Kaoru Yasumatsuya, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 127 days.

(21) Appl. No.: 10/891,494

(22) Filed: Jul. 15, 2004

(65) Prior Publication Data
US 2005/0031427 A1   Feb. 10, 2005

(30) Foreign Application Priority Data
Jul. 15, 2003   (JP)   ............... 2003-197438

(51) Int. Cl.
B23C 1/27   (2006.01)
B23Q 11/00  (2006.01)
B23Q 1/01   (2006.01)

(52) U.S. Cl. ............. 409/235; 409/137; 409/136; 408/234; 408/67

(58) Field of Classification Search ............... 409/235, 409/137, 135, 136, 134; 408/67–68, 234; 29/33 P, DIG. 94, DIG. 101, DIG. 102
See application file for complete search history.

(56) References Cited

U.S. PATENT DOCUMENTS

| | | | | |
|---|---|---|---|---|
| 4,539,876 A | * | 9/1985 | Myers et al. | 409/137 |
| 5,078,256 A | * | 1/1992 | Hatano et al. | 409/137 |
| 5,147,161 A | * | 9/1992 | Whiting | 409/136 |
| 5,611,137 A | * | 3/1997 | Braun | 409/235 |
| 6,082,939 A | * | 7/2000 | Nakashima et al. | 409/134 |
| 6,315,106 B1 | * | 11/2001 | Hirano et al. | 409/137 |
| 6,547,498 B1 | * | 4/2003 | Sugata et al. | 409/137 |
| 6,626,285 B1 | * | 9/2003 | Enomoto | 409/137 |
| 6,745,455 B1 | * | 6/2004 | Popp et al. | 409/137 |
| 6,877,407 B1 | * | 4/2005 | Nakaminami et al. | 409/137 |
| 2005/0031425 A1 | * | 2/2005 | Hiramoto et al. | 409/235 |

FOREIGN PATENT DOCUMENTS

| | | | |
|---|---|---|---|
| DE | 3721610 A1 | * | 1/1989 |
| DE | 4415153 A1 | * | 11/1995 |
| EP | 528052 A1 | * | 2/1993 |
| JP | 2000-033530 A | | 2/2000 |

* cited by examiner

*Primary Examiner*—Erica Cadugan
(74) *Attorney, Agent, or Firm*—Smith Patent Office

(57) ABSTRACT

The present invention provides a chip discharging device for a machine tool, which is capable of making the entire machine small by minimizing a protruding amount of the chip discharging device toward the backside of the machine, and making an install space thereof small. A column 4 is arranged and fixed on an upper surface of a rear wall portion 2d of a bed 2, the rear wall portion 2d is arranged to deviate upward, rear wall inclined surfaces 2g and 2g' rising obliquely upward are formed on a bottom portion of the rear wall portion 2d, a storage tank 27 for storing coolant is arranged inside a rectangular frame of the bed 2, the storage tank 27 having a form which extends through a space beneath the rear wall portion 2d to the backside of the machine and further stands up obliquely upward along the rear wall inclined surfaces 2g and 2g', and a chip conveyor 26 is arranged inside the storage tank 27 for conveying chips to the backside of the machine.

4 Claims, 6 Drawing Sheets

CHIP DISCHARGING DEVICE FOR MACHINE TOOL

BACKGROUND OF THE INVENTION

1. Filed of the Invention

The present invention relates to a chip discharging device which discharges chips and recovers coolant in a machine tool such as a horizontal machining center or the like.

2. Discussion of the Related Art

In a machine tool such as the above-mentioned horizontal machining center, there is generally provided a chip discharging device for discharging chips generated by cutting work and recovering coolant. As a chip discharging device of this type, there is one in which a recessed portion to form a chip recovery space is formed between left and right side walls of a bed, a storage tank which stores coolant is arranged in the recessed portion, the storage tank extends to the backside of the machine and has a form to stand up obliquely upward, a conveyor which conveys chips is arranged in the storage tank, and a recovery bucket is arranged beneath a standing portion of the storage tank (for example, refer to Japanese Patent Application Laid-open No. Hei 2000-33530).

SUMMARY OF THE INVENTION

In the conventional chip discharging device, there is a problem that, since the storage tank extends to the backside of the machine and is constructed to stand up obliquely upward, the chip discharging device largely protrudes toward the backside of the machine to make the entire machine larger, so that an install space thereof becomes large.

The present invention is made in view of the above-described conventional situation, and an object thereof is to provide a chip discharging device for a machine tool, which is capable of making the entire machine small by minimizing a protruding amount of the chip discharging device toward the backside of the machine, and making an install space thereof small.

In a first invention, a chip discharging device for a machine tool which has a bed; a table arranged on the bed to be movable in a forward and backward (Z axis) direction; a spindle head configured to be movable in an up and down (Y axis) direction and in a left and right (X axis) direction; a spindle supported by the spindle head to horizontally face a front side of the machine; a column fixed upright on the bed; and a saddle arranged on a front surface of the column to be movable in the left and right (X axis) direction, in which the spindle head is arranged on a front surface of the saddle to be movable in the up and down (Y axis) direction, the bed is formed in a rectangular frame shape in plan view which has left and right side wall portions extending in the Z axis direction, on which guide rails for moving the table are arranged, and front and rear wall portions connecting front end portions and rear end portions of the left and right side wall portions respectively, the column is arranged and fixed on an upper surface of the rear wall portion of the bed, the rear wall portion is arranged to deviate upward, and a rear wall inclined surface rising obliquely upward is formed on a bottom portion of the rear wall portion, the chip discharging device including a storage tank for storing coolant arranged inside the rectangular frame of the bed, the storage tank having a form which extends through a space beneath the rear wall portion to a backside of the machine and further stands up obliquely upward along the rear wall inclined surface, and a chip conveyor arranged inside the storage tank for conveying chips to the backside of the machine.

In this invention, the rear wall portion of the bed is arranged to deviate upward, and the rear wall inclined surface rising obliquely upward is formed on the bottom portion of the rear wall portion, and the storage tank has a form which extends through the space beneath the rear wall portion to the backside of the machine and further stands up obliquely upward along the rear wall inclined surface, so that a standing portion of the storage tank can be made close to the backside of the column. Therefore, the protruding amount of the chip discharging device toward the backside of the machine can be made small accordingly to make the entire machine smaller, and thus an install space of the entire machine can be reduced.

Further, since the column is fixed on the bed, the storage tank can be made deeper to increase its capacity by arranging the rear wall portion of the bed to deviate upward, while securing the stiffness of the bed. Incidentally, in a type in which a column is moved in an X axis direction, a bed under column guides becomes thin and stiffness thereof decreases when the storage tank is made deeper.

In one preferred embodiment of the first invention, a column inclined surface continuous to the rear wall inclined surface of the bed is formed on a rear end portion of a bottom surface of the column, and the storage tank has a form which stands up obliquely upward from the rear wall inclined surface along the column inclined surface.

In the embodiment, the column inclined surface continuous to the rear wall inclined surface of the bed is formed on the rear end portion of the bottom surface of the column, and the storage tank has the form which stands up obliquely upward from the rear wall inclined surface along the column inclined surface, so that the chip discharging device can be made further closer to the backside of the column, and thus a backward protruding amount of the chip discharging device can be further decreased.

In another preferred embodiment of the first invention, spaces substantially continuous to the rear wall inclined surface are formed by cutting out rear end bottom surfaces of the left and right side walls of the bed, and the spaces are used as an arrangement space for the storage tank.

In the embodiment, the spaces substantially continuous to the rear wall inclined surface are formed by cutting out the rear end bottom surfaces of the left and right side walls of the bed, and the spaces are used as the arrangement space for the storage tank, so that the capacity of the storage tank can be secured, while making the chip discharging device closer to the backside of the column. Specifically, when the chip discharging device is made close to the backside of the column as in the present invention, the capacity of the storage tank becomes small, but in the present invention, the spaces formed at the rear end bottom surfaces of the left and right side walls of the bed are used as the arrangement space for the storage tank, so that the above-described problem can be avoided.

Incidentally, in the machine tool described in the above-mentioned conventional publication, a pair of front and rear column guide rails are arranged in parallel to the X axis on an upper surface of a rear end portion of the bed, and the column is supported to be movable in the X axis direction by the guide rails, so that it is necessary to arrange the guide rails with a relatively wide space in a forward and backward direction. Accordingly, it is difficult to apply the present invention, in which the inclined surface is formed on the bottom surface of the rear wall portion of the bed or further formed so as to reach the rear end portion of the bottom surface of the column, to the machine tool described in the above-mentioned publication. In the present invention, since the column is fixedly arranged on the upper surface of the rear end portion of the bed, the above-described structure can be adopted without any difficulty.

BRIEF DESCRIPTION OF THE DRAWINGS

The configuration and the operation and effect of the present invention will be described in detail in an embodiment based on the following attached drawings.

DETAILED DESCRIPTION OF THE PREFERRED EMBODIMENTS

Hereinafter, an embodiment of the present invention will be described based on the attached drawings.

Figure 1:
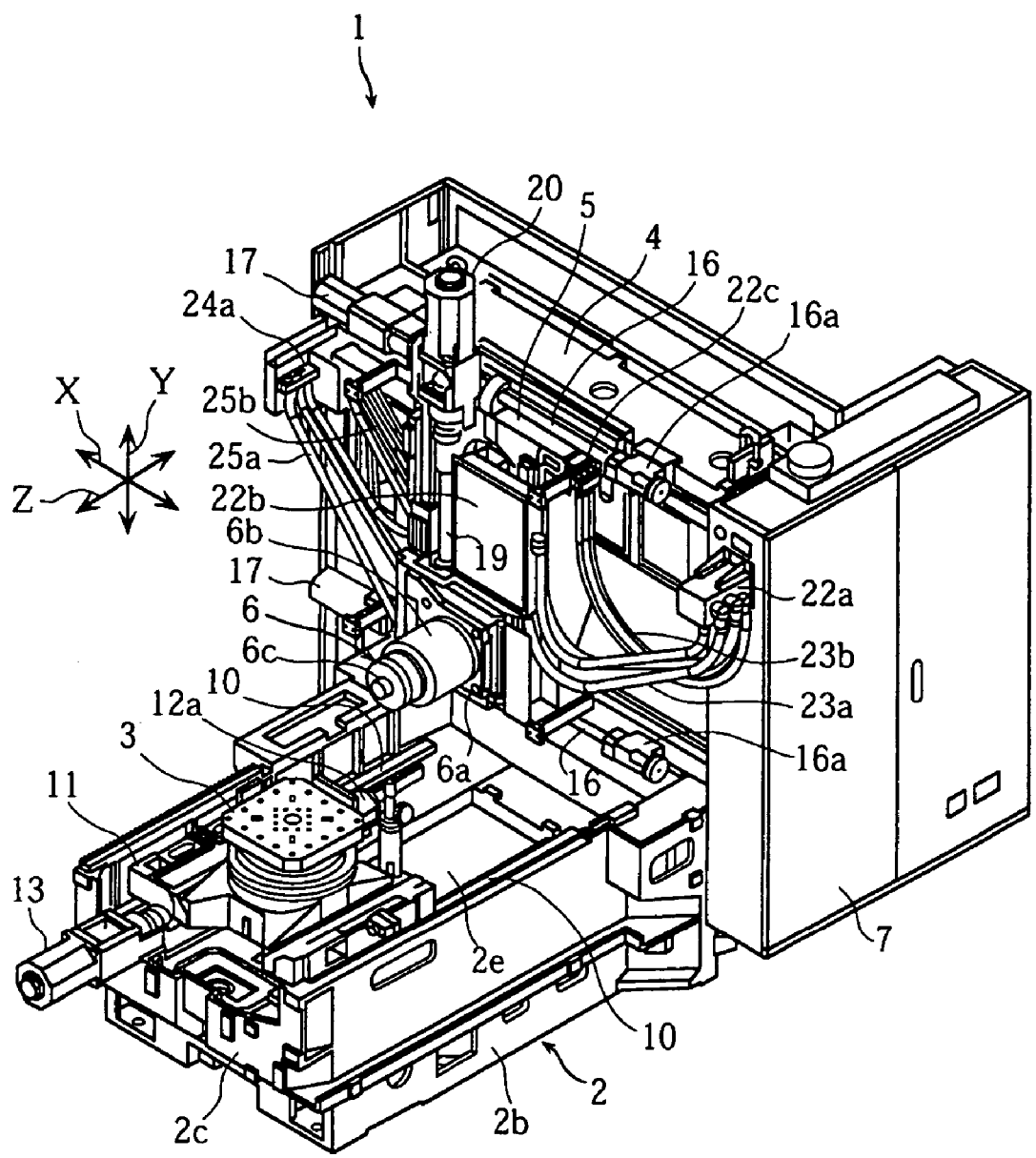
FIG. 1 is a perspective front view of a horizontal machining center according to one embodiment of the present invention.
Figure 2:
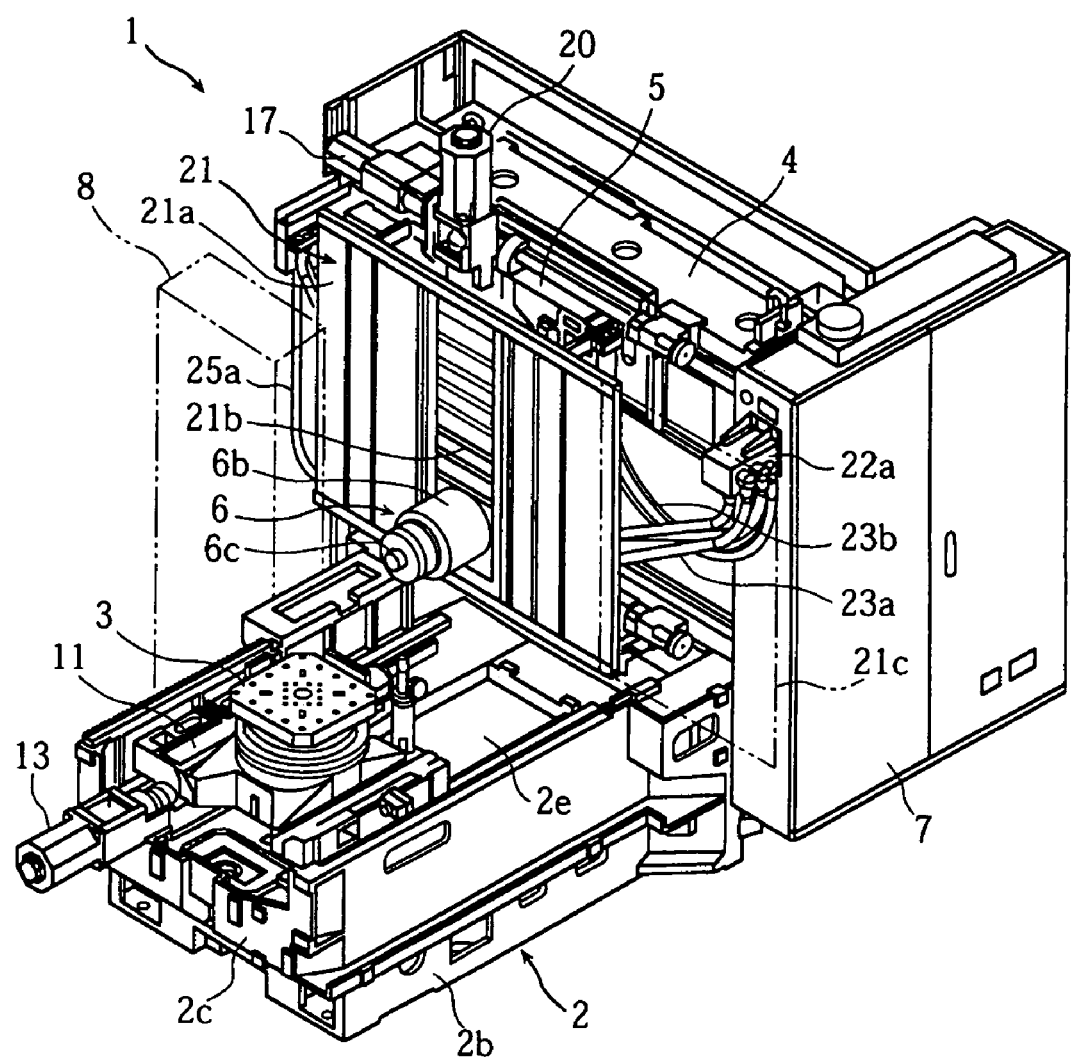
FIG. 2 is a perspective front view of the horizontal machining center.
Figure 3:
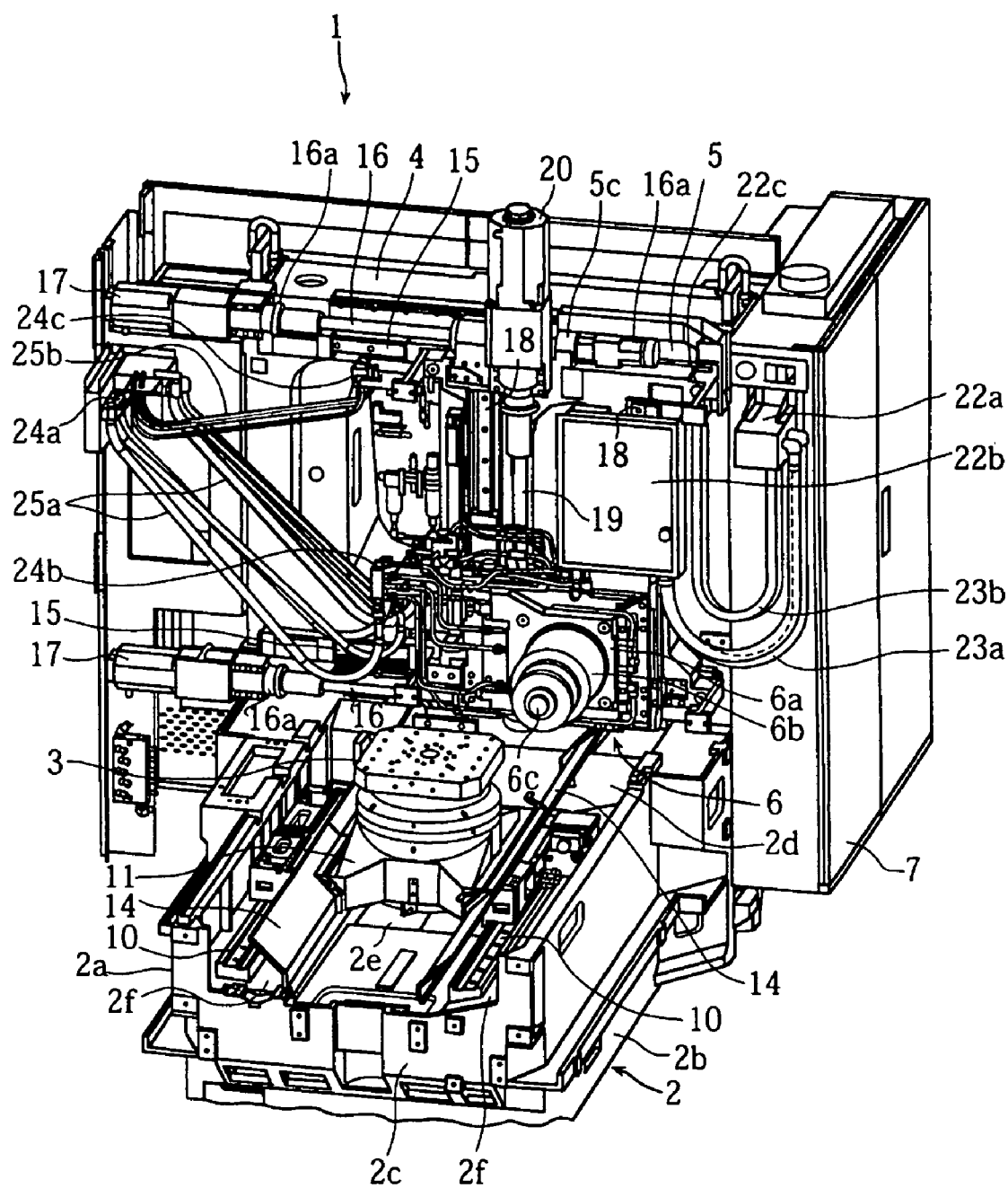
FIG. 3 is a perspective front view showing an arrangement structure of the horizontal machining center.
Figure 4:
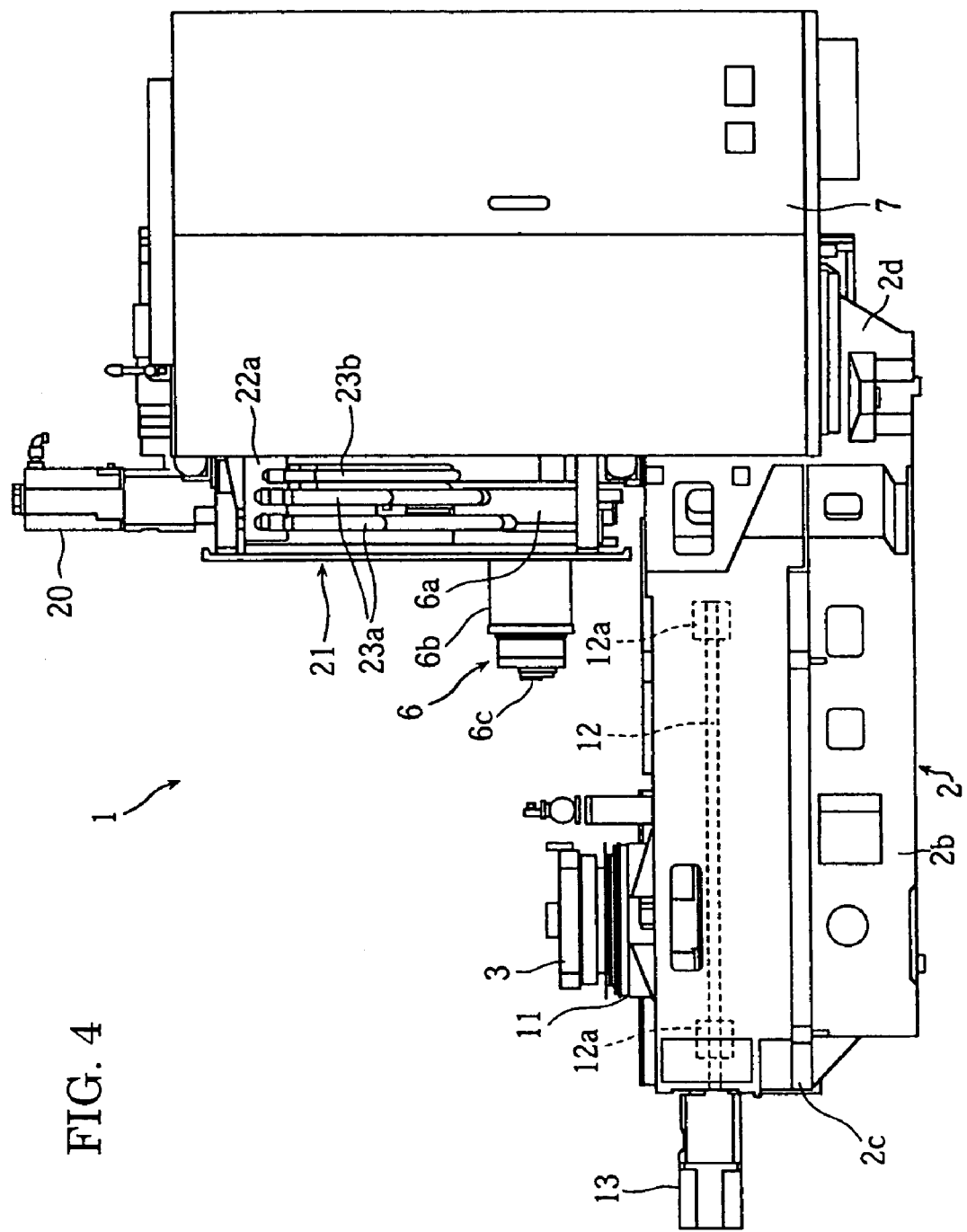
FIG. 4 is a right side view of the horizontal machining center.
Figure 5:
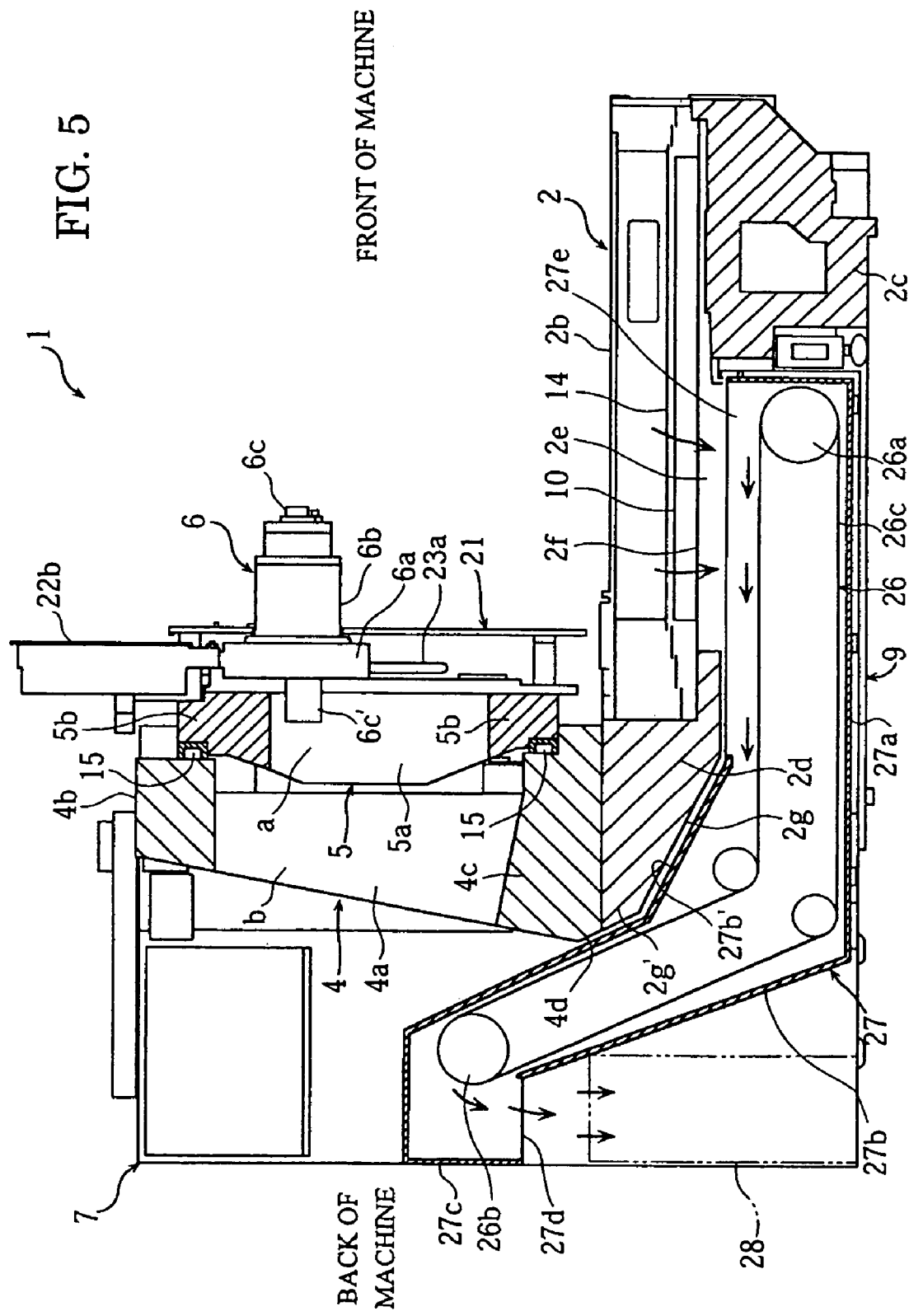
FIG. 5 is a cross-sectional left side view of the horizontal machining center.
Figure 6:
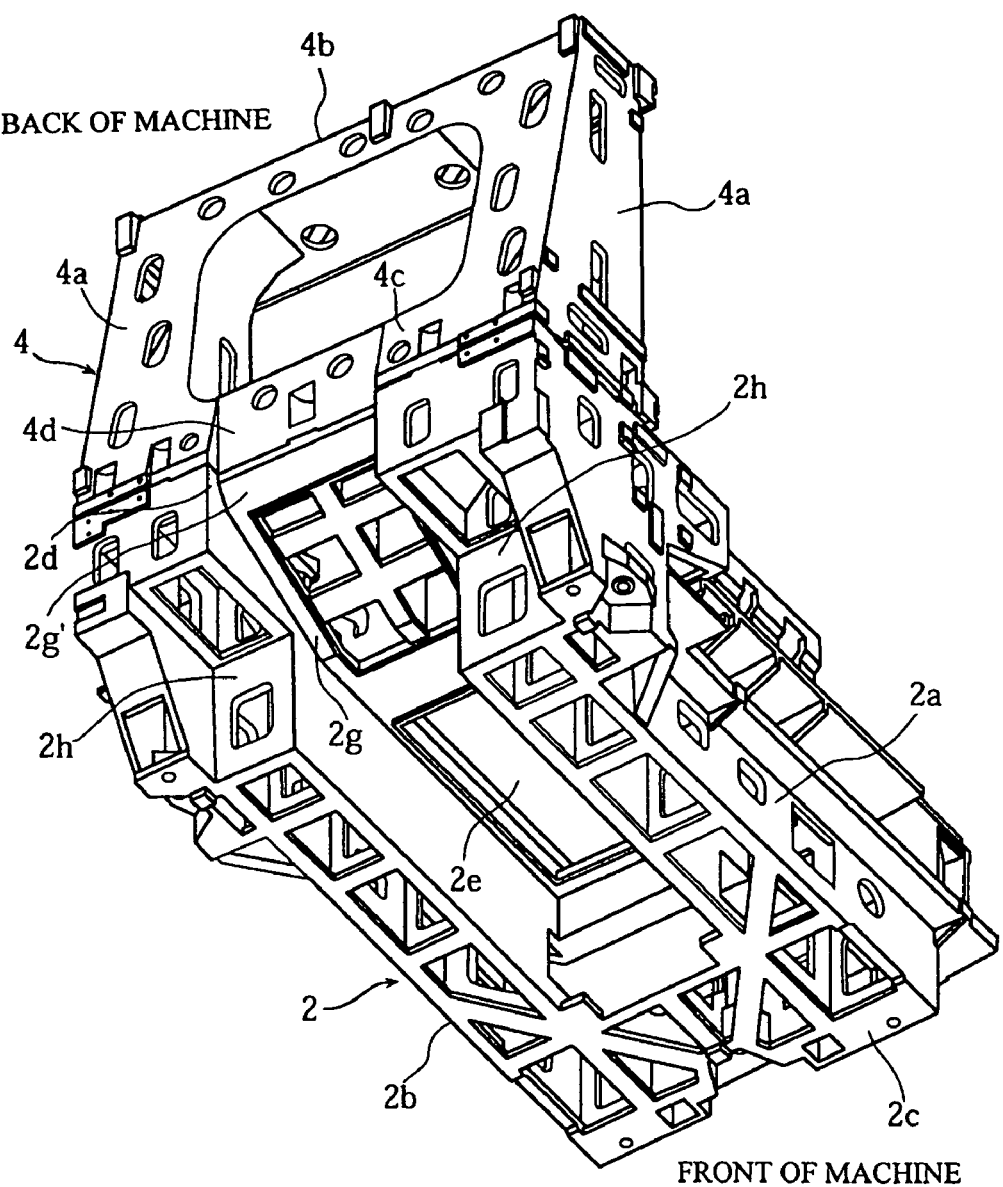
FIG. 6 is a perspective bottom view of a bed and a column of the horizontal machining center.

FIG. 1 to FIG. 6 are views for describing a chip discharging device for a horizontal machining center according to one embodiment of the present invention, FIG. 1 and FIG. 2 are perspective front views of the horizontal machining center, FIG. 3 is a perspective front view showing an arrangement structure, FIG. 4 and FIG. 5 are a right side view and a cross-sectional left side view of the horizontal machining center respectively, FIG. 6 is a perspective view of a bed and a column seen from a bottom surface. Incidentally, in this specification, front/rear and left/right mean directions seen from the front of the machine.

In the figures, a numeral 1 denotes a horizontal machining center. This machining center 1 has a schematic structure as follows. A bed 2 has a substantially rectangular frame shape in a plan view. On an upper surface of the bed 2, a table 3 is arranged to be movable in a Z axis (forward and backward) direction, and on a rear end portion of the upper surface of the bed 2, a column 4 is fixedly arranged. On a front surface of the column 4, a saddle 5 is arranged to be movable in an X axis (horizontal) direction, and on the saddle 5, a spindle head 6 is arranged to be movable in a Y axis (vertical) direction. Furthermore, on a right side surface of a rear end portion of the bed 2, a control board 7 is arranged, and on a left side surface of a front portion thereof, an automatic tool changer 8 is arranged. Moreover, inside a rectangular frame of the bed 2, a chip discharging device 9 which discharges chips to the backside of the machine is arranged.

The bed 2 is made by casting and formed in a rectangular shape which has left and right side wall portions 2a and 2b each in a cylindrical shape extending in a forward and backward direction, a front wall portion 2c connecting front portions of both the side wall portions 2a and 2b with each other, a rear wall portion 2d which connects rear portions thereof with each other, and an opening 2e in a rectangular shape in a plan view.

The front wall portion 2c of the bed 2 has the same height of a bottom surface as those of the left and right side wall portions 2a and 2b, while the rear wall portion 2d is arranged to deviate upward, and a space for arranging the chip discharging device 9 is formed between the rear wall portion 2d and a floor surface. Furthermore, on a bottom portion of the rear wall portion 2d, a rear wall inclined surface 2g is formed to obliquely rise upward by cutting out and removing a rear portion of the bottom portion, and a rear end portion of the rear wall inclined surface 2g is a rear wall inclined surface 2g' having a larger angle of inclination. Then, on a rear end portion of a lower end surface of the column 4, a column inclined surface 4d continuous to the rear wall inclined surface 2g' is formed. Incidentally, widths (lengths in the X axis direction) of the inclined surfaces 2g, 2g', and 4d are set to be substantially the same width as a length between internal surfaces of the left and right side walls 2a and 2b of the bed 2, that is, a width corresponding to a storage tank 27, which will be described later, of the chip discharging device 9.

On rear end portions of the left and right side wall portions 2a and 2b, cut-out portions 2h are formed by cutting out rear portions of the left and right side wall portions, and by these cut-out portions 2h, spaces are formed between the left and right side walls and a floor surface. These spaces are substantially continuous to a space formed by arranging the rear wall portion 2d to deviate upward and by forming the inclined surfaces 2g and 2g'.

On upper surfaces of the left and right side wall portions 2a and 2b of the bed 2, support surfaces 2f are formed so as to step down to the opening 2e side. On the support surfaces 2f, table guide rails 10 and 10 extending in a forward and backward direction are arranged. On the table guide rails 10 and 10, a table support 11 is mounted to be freely movable in the Z axis (forward and backward) direction, and the above-described table 3 is mounted on the table support 11.

A nut member (not-shown) is arranged on a left end of a bottom surface of the table support 11, and a table ball screw 12 for driving the table is screwed into the nut member. This table ball screw 12 is arranged in parallel to the Z axis, and a front end portion and a rear end portion thereof are pivotally supported by bearings 12a and 12a arranged on the support surfaces 2f on the bed 2. On the front end portion of the table ball screw 12, a table motor 13 for driving the table is connected, and by rotationally driving the table ball screw 12 by the table motor 13, the table support 11 and further the table 3 move in the Z axis direction on the bed 2.

The left and right table guide rails 10 and 10 and the table ball screw 12 are covered with Z axis chip covers 14 each made of a metal sheet and arranged on an upper side thereof. These Z axis chip covers 14 are for preventing chips from falling on the table guide rails 10 and the table ball screw 12. These Z axis chip covers 14 are inclined inward to allow the chips to fall toward the opening 2e of the bed 2, and move along with movement of the table support 11 in the Z axis direction.

The column 4 is in a rectangular frame shape which has, when seen from the front, left and right side portions 4a and 4a, an upper side portion 4b connecting upper end portions of both the side portions with each other, and a lower side portion 4c connecting lower end portions thereof with each other. The left and right side portions 4a are each formed in a columnar shape which has a front surface which stands perpendicularly and a back surface which inclines such that an upper side thereof is located more forward than a lower side thereof, when seen from a side.

On front surfaces of the upper side portion 4b and the lower side portion 4c, upper and lower saddle guide rails 15 and 15 extending in the X axis direction are arranged horizontally. By these saddle guide rails 15 and 15, the saddle 5 is supported to be freely movable in the X axis direction.

The saddle 5 is in a substantially rectangular frame shape which has left and right side portions 5a and 5a and upper and lower side portions 5b and 5b. On an upper edge and a lower edge of the saddle 5, nut members 5c are arranged, and saddle ball screws 16 and 16 for driving the saddle are screwed into the upper and lower nut members 5c. These saddle ball screws 16 are pivotally supported at their front and rear end portions by bearings 16a arranged on a front surface of the column 5, and on left end portions of the upper and lower saddle ball screws 16, saddle motors 17 for driving the saddle are connected. By rotationally driving the saddle ball screws 16 by the saddle motors 17, the saddle 5 and further the spindle head 6 move in the X axis (left and right) direction.

On a front surface of the saddle 5, a pair of left and right spindle guide rails 18 and 18 extending in the Y axis direction are arranged and fixed perpendicularly. By these left and right spindle guide rails 18 and 18, the spindle heard 6 is supported to be freely movable in the Y axis direction. This spindle head 6 has a spindle base 6a in a rectangular plate shape and a spindle support 6b which is fixed on the spindle base 6a to extend in a horizontal direction and supports a spindle 6c facing a front side in a horizontal direction.

A nut member is arranged on a back surface of a left side portion of the spindle base 6a, and a spindle ball screw 19 for feeding the spindle is screwed into the nut member. Upper and lower end portions of this spindle ball screw 19 are pivotally supported by bearings fixed on the saddle 5, and on an upper end portion of the spindle ball screw 19, a spindle feed motor 20 for feeding the spindle is connected. Incidentally, the spindle 6c supported by the spindle head 6 is rotationally driven by a built-in motor for driving the spindle. A cooling jacket is formed on the spindle 6c, particularly on a bearing portion thereof, and cooling oil is supplied to the cooling jacket as will be described later.

Here, a rear end portion 6c' of the spindle 6c moves in the Y axis direction inside a spindle opening "a" formed by the upper/lower and left/right side portions of the saddle 5, and faces backward through a maintenance opening "b" formed by the left and right side portions and the upper and lower side portions of the column 4. Specifically, inspection and maintenance around the rear end portion 6c' of the spindle 6c can be performed through the opening "a" and "b" formed on the column 4 and the saddle 5, so that the maintainability thereof is improved.

Further, the spindle head 6 has a partition cover 21 for preventing chips and the like from falling on the saddle guide rails 15, the spindle guide rails 18, the saddle ball screws 16, the spindle ball screw 19, and so on. This partition cover 21 has an X axis cover portion 21a fixed and supported on the saddle 5 and moving with the spindle head 6 in the X axis direction, and a Y axis cover portion 21b moving with the spindle head base 6a in the Y axis direction.

Incidentally, the X axis cover portion 21a is formed in a flat plate shape which does not expand or contract, and the Y axis cover portion 21b is formed as a telescopic type which expands and contracts. A left edge portion of the X axis cover portion 21a is configured to enter a back surface of the automatic tool changer 8, and a right edge portion thereof is configured to enter a back surface of a cover 21c arranged and fixed on a front side of the control board 7. Thus, even when the partition cover 21 moves in the X axis direction along with movement of the saddle 5, no gap will be formed on the left and right sides of the partition cover 21.

The control board 7 is in a rectangular box shape and attached to a right side wall rear portion of the bed 2. On an upper end portion of a front surface of this control board, a fixed side relay box 22a as a fixed side wire supply portion is attached.

Further, above the right side of the spindle base 6a, a spindle side terminal box 22b as a spindle side wiring relay portion is attached. Inside this spindle side terminal box 22b, power supply terminals, various signal terminals, and the like are arranged, and these respective terminals are connected to the built-in motor for driving the spindle, sensors and the like.

The fixed side relay box 22a and the spindle side terminal box 22b are connected by flexible tubes 23a which accommodate spindle side electrical wires, and the spindle side electrical wires from respective devices of the control board 7 are connected via the fixed side relay box 22a and through the flexible tubes 23a to respective terminals inside the spindle side terminal box 22b.

Furthermore, saddle side electrical wires from the control board 7 are connected from the fixed side relay box 22a through flexible tubes 23b to the spindle feed motor 20 for driving the spindle ball screw 19, sensors and the like. Incidentally, 22c is a block for fixing the flexible tubes 23b on the saddle 5.

The respective electrical wires and the flexible tubes 23a and 23b which accommodate and protect the respective electrical wires have flexibility to bend easily as a whole, and are set to have lengths and bending forms corresponding to a movable range of the spindle base 6a and a movable range of the saddle 5.

Here, the flexible tubes 23a for the spindle side electrical wires are arranged to be located between the partition wall cover 21 and the front surface of the saddle 5, and the flexible tubes 23b for the saddle side electrical wires are arranged to be located between the partition cover 21 and the front surface of the column 4.

On a left side wall portion of the column 4; there is fixed a fixed side joint 24a which has supply ports of coolant, lubricant oil, compressed air and the like, and oil supply and drain ports of cooling oil and the like, and functions as a pipe supply portion. Incidentally, although not shown, supply sources of coolant, lubricant oil, compressed air and the like and a supply source of cooling oil and the like are connected to an inlet of the fixed side joint 24a.

Further, on a left side portion of the spindle base 6a, there is attached a spindle side relay joint 24b which has relay ports of coolant, lubricant oil, compressed air and the like, and oil supply and drain relay ports of cooling oil, and the like, and functions as a spindle side pipe relay portion. Incidentally, an outlet of the spindle side relay joint 24b is connected to a coolant discharge port, lubricated portions, an air cylinder, the above-described cooling jacket, and the like of the spindle head 6 by a distribution pipe and the like. Furthermore, on the saddle 5, a saddle side relay joint 24c which has a relay port of lubricant oil and the like and functions as a saddle side pipe relay portion is attached, and an outlet of the saddle side relay joint 24c is connected by distribution pipes to lubricated portions of the saddle 5 side.

Then, an outlet of the fixed side joint 24a and inlets of the spindle side relay joint 24b and the saddle side relay joint 24c are communicatively connected by spindle side utility pipes 25a and saddle side utility pipes 25b, respectively. As the respective utility pipes 25a and 25b, adopted are so-called flexible tubes having flexibility to bend easily, and they are set to have lengths and bending forms corresponding to the movable range of the spindle base 6a and the movable range of the saddle 5.

Here, the spindle side utility pipes 25a are arranged to be located between the partition cover 21 and the front surface of the saddle 5, and the saddle side utility pipes 25b are arranged to be located between the partition cover 21 and the front surface of the column 4.

The chip discharging device 9 has a conveyor 26 which carries chips to the backside of the column 4 and a storage tank 27 which accommodates the conveyor 26 and stores chips, coolant and the like which fall out from the conveyor 26.

The storage tank 27 is in a shape which extends from a lower side of the opening 2e of the bed 2 through a space beneath the rear wall portion 2d to the backside of the column 4, and there stands up obliquely upward to be substantially in contact with the inclined surfaces 2g, 2g', and 4d. Specifically, the storage tank 27 has a storage portion 27a which stores chips, coolant and the like via a collecting port 27e, an inclined portion 27b whose ceiling surface 27b' stands up obliquely along the aforementioned inclined surfaces, and a discharge portion 27c which drops the chips through a discharge port 27d into a container 28 such as a drum arranged therebelow.

Here, the storage tank 27 is arranged to be close to the backside of the column such that the ceiling surface 27b' of the inclined portion 27b is substantially in contact with the inclined surfaces 2g, 2g' and 4d. In other words, the storage tank 27 is arranged so as to minimize a protrusion amount of the discharging portion 27c toward the backside of the machine (the left side in FIG. 5).

Further, a boundary portion between the storage portion 27a of the storage tank 27 and the inclined portion 27b expands toward the cut-out portions 2h formed on the bed 2, thereby increasing a storage capacity thereof.

The conveyor 26 is structured such that a belt 26c constituted by a large number of metal plates in a band plate shape being connected together is wound around driving pulleys 26a and 26b, and is formed in a shape that extends along the shape of the storage box 27 from under the opening 2e to the backside of the machine and stands up obliquely upward along the aforementioned inclined surfaces.

In the horizontal machining center 1 of this embodiment, a work is machined by a tool fitted to the spindle 6c while moving the table 3 to which the work is fixed in the Z axis direction, the saddle 5 in the X axis direction, and the spindle head 6 in the Y axis direction, respectively. In this machining of a work, the flexible tubes 23a and 23b which accommodate electrical wires and the utility pipes 25a and 25b transform, along with the movement of the saddle 5 and the spindle head 6, between a state hanging down with a small radius of bending and a state stretched in both directions so as to draw an arc with a large radius in a space between the partition cover 21 and the saddle 5 or the column 4, so that the moving amount is absorbed.

Thus, in this embodiment, since the column 4 is fixed and arranged on the bed 2, and the flexible tubes 23a and 23b for various electrical wires and the utility pipes 25a and 25b which connect the fixing side and the moving side are arranged on the front side of the column 4, these arrangement structure can be simplified, and decrease of supporting stiffness for the column can be avoided.

Specifically, when a structure to arrange the wires and pipes on the backside of the column is adopted for example, there arises a need to form in the column an opening which corresponds to movable ranges of the saddle and the spindle head, so that there is a possibility that the supporting stiffness for the column decreases as a result, and also a structure for drawing the relay box or the like to the backside of the column is needed, but such problems do not occur in this embodiment.

Further, in this embodiment, since the flexible tubes 23a and 23b for respective electrical wires and the utility pipes 25a and 25b are arranged between the partition cover 21 and the column 4, it is possible to avoid falling of the coolant and chips on these wires and pipes, so that the durability of the wires and pipes can be improved. Further, the electrical wires and the utility pipes cannot be seen from an operator side, so that deterioration of appearance due to arrangement on the front side of the column can be avoided.

Further, in this embodiment, to provide the chip discharging device 9 at a center bottom portion of the bed 2, the inclined surfaces 2g and 2g' are formed on the rear wall portion 2d of the bed 2, the inclined surface 4d is formed on a rear end portion of a lower surface of the column 4, and furthermore the chip discharging device 9 is raised so that a ceiling wall 27b' of the inclined portion 27b is substantially in contact with the inclined surfaces. Consequently, a protruding amount of the chip discharging device 9 toward the backside of the machine can be minimized, so that the entire machine can be made smaller to thereby reduce an install space thereof.

Further, since the column 4 is fixed above the rear wall portion 2d of the bed 2, the stiffness of the bed 2 can be secured, while the rear wall portion 2d is arranged to deviate upward to increase the capacity of the storage tank 27.

Furthermore, by forming the cut-out portions 2h on the rear end portions of the left and right side wall portions 2a and 2b of the bed 2, the spaces substantially continuous to the rear wall inclined surface 2g are formed, and these spaces are used as an arrangement space for the storage tank 27, so that the capacity of the storage tank 27 is secured while the chip discharging device is arranged to be close to the backside of the column. Specifically, as in this embodiment, when the chip discharging device is arranged such that the inclined portion 27b thereof becomes close to the backside of the column, the capacity of the storage tank 27 decreases, but this problem can be avoided since the spaces formed by the cut-out portions 2h of the bed 2 are used as the arrangement space for the storage tank.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A chip discharging device for a machine tool which has a bed; a table arranged on the bed to be movable in a forward and backward (Z axis) direction; a spindle head configured to be movable in an up and down (Y axis) direction and in a left and right (X axis) direction; a spindle supported by the spindle head to horizontally face a front side of the machine; a column fixed upright on the bed; and a saddle arranged on a front surface of the column to be movable in the left and right (X axis) direction, in which the spindle head is arranged on a front surface of the saddle to be movable in the up and down (Y axis) direction, the bed is formed in a rectangular frame shape in plan view which has left and right side wall portions extending in the Z axis direction on which guide rails for moving the table are arranged, and front and rear wall portions connecting front end portions and rear end portions of the left and right side wall portions respectively, the column is arranged and fixed on an upper surface of the rear wall portion of the bed, the rear wall portion is arranged to deviate upward, and a rear wall inclined surface rising obliquely upward is formed on a bottom portion of the rear wall portion, the chip discharging device comprising:
- a storage tank for storing coolant arranged inside the rectangular frame of the bed, said storage tank having a form which extends through a space beneath the rear wall portion to a backside of the machine tool and further stands up obliquely upward along the rear wall inclined surface; and
- a chip conveyor arranged inside said storage tank for conveying chips to the backside of the machine tool.

2. The chip discharging device for the machine tool according to claim 1, wherein a column inclined surface continuous to the rear wall inclined surface of the bed is formed on a rear end portion of a bottom surface of the column, and said storage tank has a form which stands up obliquely upward from the rear wall inclined surface along the column inclined surface.

3. The chip discharging device for the machine tool according to claim 2, wherein spaces substantially continuous to the rear wall inclined surface are formed by cutting out rear end bottom surfaces of the left and right side walls of the bed, and the spaces are used as an arrangement space for said storage tank.

4. The chip discharging device for the machine tool according to claim 1, wherein spaces substantially continuous to the rear wall inclined surface are formed by cutting out rear end bottom surfaces of the left and right side walls of the bed, and the spaces are used as an arrangement space for said storage tank.

* * * * *